United States Patent
Conley et al.

(10) Patent No.: US 12,512,913 B2
(45) Date of Patent: Dec. 30, 2025

(54) INTEGRATED OPTICAL RECEIVER WITH MONITOR PHOTODIODE

(71) Applicant: LUMENTUM TECHNOLOGY UK LIMITED, Northamptonshire (GB)

(72) Inventors: Stuart Conley, Newton Abbot (GB); Colin Smith, Paignton (GB); Nick Brooks, Paignton (GB)

(73) Assignee: Lumentum Technology UK Limited, Northamptonshire (GB)

( * ) Notice: Subject to any disclaimer, the term of this patent is extended or adjusted under 35 U.S.C. 154(b) by 281 days.

(21) Appl. No.: 18/326,313

(22) Filed: May 31, 2023

(65) Prior Publication Data
US 2024/0291571 A1   Aug. 29, 2024

Related U.S. Application Data

(60) Provisional application No. 63/487,425, filed on Feb. 28, 2023.

(51) Int. Cl.
*H04B 10/61* (2013.01)
*H04B 10/079* (2013.01)

(52) U.S. Cl.
CPC ....... *H04B 10/61* (2013.01); *H04B 10/07955* (2013.01)

(58) Field of Classification Search
CPC ...... H04B 10/60; H04B 10/61; H04B 10/564; H04B 10/64; H04B 10/63; H04B 10/65; H04B 10/66; H04B 10/67; H04B 10/671; H04B 10/672; H04B 10/676; H04B 10/69; H04B 10/0777; H04B 10/0775; H04B 10/07955; H04J 14/0221; H04J 14/06
See application file for complete search history.

(56) References Cited

U.S. PATENT DOCUMENTS

| | | | | |
|---|---|---|---|---|
| 2004/0247231 A1* | 12/2004 | Lee | ..................... | G02B 6/12007 385/14 |
| 2008/0138070 A1* | 6/2008 | Yan | ........................ | H04J 14/06 398/65 |
| 2013/0170843 A1* | 7/2013 | Baney | .................. | H04B 10/614 398/212 |
| 2014/0348517 A1* | 11/2014 | Shibata | ................ | G02B 6/4286 398/214 |
| 2018/0109348 A1* | 4/2018 | Salsi | ...................... | H04B 10/40 |

OTHER PUBLICATIONS

"100G Integrated Coherent Receiver," Finisar Corporation, 2015, 3 pages.

* cited by examiner

*Primary Examiner* — Hibret A Woldekidan
(74) *Attorney, Agent, or Firm* — Harrity & Harrity, LLP

(57) ABSTRACT

An optical receiver includes an integrated receiver chip includes a data port configured to receive an optical data signal derived from a receive optical signal, a first waveguide coupled to the data port and configured to transmit the optical data signal from the data port to an optical waveguide circuit of the integrated receiver chip, a power monitoring port configured to receive an optical monitoring signal derived from the receive optical signal, and a second waveguide coupled to the power monitoring port and configured to transmit the optical monitoring signal to a monitor photodiode that is monolithically integrated in the integrated receiver chip. The monitor photodiode is configured to convert the optical monitoring signal into an electrical signal representative of an optical input power of the receive optical signal.

20 Claims, 6 Drawing Sheets

INTEGRATED OPTICAL RECEIVER WITH MONITOR PHOTODIODE

CROSS-REFERENCE TO RELATED APPLICATION

This Patent Application claims priority to U.S. Patent Application No. 63/487,425, filed on Feb. 28, 2023. The disclosure of the prior Application is considered part of and is incorporated by reference into this Patent Application.

TECHNICAL FIELD

The present disclosure relates generally to integrated optical receivers.

BACKGROUND

An optical receiver may be used to receive an optical signal (e.g., an optical data signal, such as an optical communication signal) and convert the optical signal into an electrical signal that can be read by an electronic device. The optical signal may be transmitted as pulses of light that can be translated into information. For example, the optical receiver may be coupled to a fiber optic network for receiving the optical signal and may convert the optical signal into one or more electrical signals that is representative of the information transmitted by the optical signal. The optical receiver may include one or more photodiodes that are configured to convert the optical signal into electrical signals (e.g., data signals). Thus, the optical receiver may be used to recover information transmitted through the fiber optic network.

SUMMARY

In some implementations, an optical receiver includes a housing comprising an optical port configured to receive a receive (RX) optical signal; an optical assembly arranged in the housing, wherein the optical assembly comprises a beam splitter configured to receive the RX optical signal and split the RX optical signal into an optical monitoring signal and an optical data signal; and an integrated receiver chip arranged in the housing, wherein the integrated receiver chip includes a data port configured to receive at least a portion of the optical data signal, a first waveguide coupled to the data port and configured to transmit at least the portion of the optical data signal from the data port to an optical waveguide circuit of the integrated receiver chip, a power monitoring port configured to receive the optical monitoring signal, and a second waveguide coupled to the power monitoring port and configured to transmit the optical monitoring signal to a monitor photodiode that is monolithically integrated in the integrated receiver chip, wherein the monitor photodiode is configured to receive the optical monitoring signal and convert the optical monitoring signal into an electrical signal representative of an optical input power of the RX optical signal, wherein the optical assembly is arranged between the optical port and the integrated receiver chip, external to the integrated receiver chip.

In some implementations, an optical receiver includes a housing comprising an optical port configured to receive an RX optical signal; an optical assembly arranged in the housing, wherein the optical assembly comprises a beam splitter configured to receive the RX optical signal and split the RX optical signal into an optical monitoring signal and an optical data signal; and an integrated receiver chip arranged in the housing, wherein the integrated receiver chip includes a data port arranged at a chip facet of the integrated receiver chip and configured to receive at least a portion of the optical data signal, a waveguide coupled to the data port and configured to transmit at least the portion of the optical data signal from the data port to an optical waveguide circuit of the integrated receiver chip, a power monitoring port arranged at the chip facet of the integrated receiver chip, and a monitor photodiode that is monolithically integrated at the power monitoring port, wherein the monitor photodiode is configured to receive the optical monitoring signal and convert the optical monitoring signal into an electrical signal representative of an optical input power of the RX optical signal, wherein the optical assembly is arranged between the optical port and the integrated receiver chip, external to the integrated receiver chip.

In some implementations, an optical receiver includes a housing comprising an optical port configured to receive an RX optical signal; an optical assembly arranged in the housing, wherein the optical assembly comprises a beam splitter configured to receive a local oscillator signal and split the local oscillator signal into a reference signal and a local oscillator monitoring signal; and an integrated receiver chip arranged in the housing, wherein the integrated receiver chip includes a data port configured to receive at least a portion of the RX optical signal, a reference port configured to receive the reference signal, a power monitoring port configured to receive the local oscillator monitoring signal, a first waveguide coupled to the data port and configured to transmit at least the portion of the RX optical signal from the data port to an optical waveguide circuit of the integrated receiver chip, a second waveguide coupled to the reference port and configured to transmit the reference signal from the reference port to the optical waveguide circuit of the integrated receiver chip, and a third waveguide coupled to the power monitoring port and configured to transmit the local oscillator monitoring signal to a monitor photodiode that is monolithically integrated in the integrated receiver chip, wherein the monitor photodiode is configured to receive the local oscillator monitoring signal and convert the local oscillator monitoring signal into an electrical signal representative of an optical input power of the local oscillator signal, and wherein the optical assembly is arranged between the optical port and the integrated receiver chip, external to the integrated receiver chip.

DETAILED DESCRIPTION

Figure 1A:
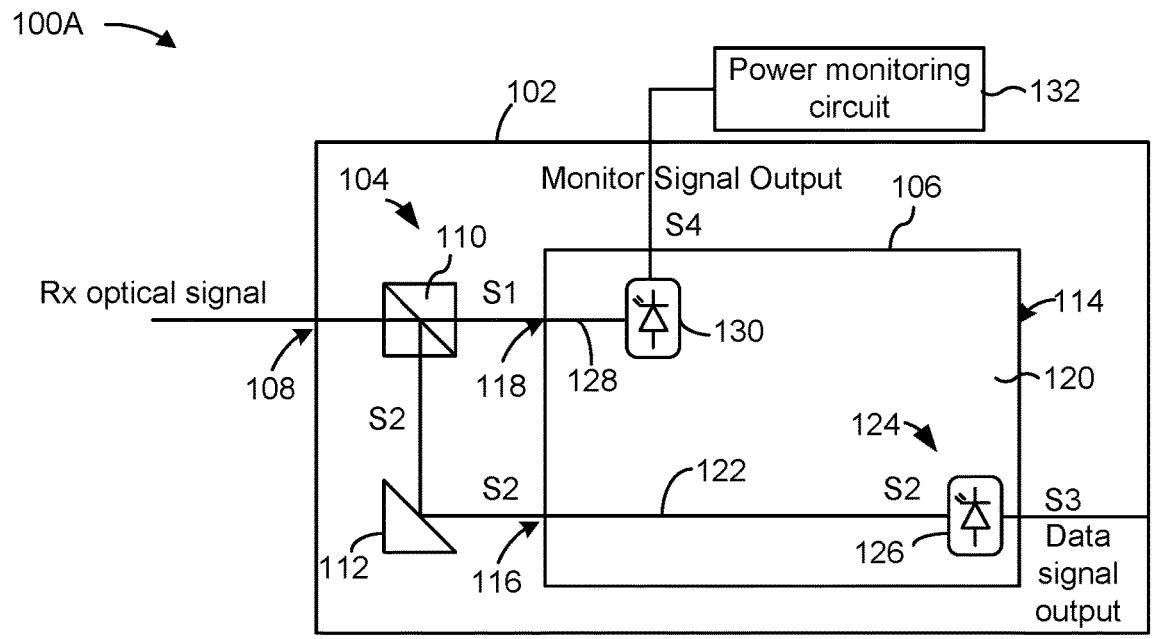
FIG. 1A shows an optical receiver according to one or more implementations.

The following detailed description of example implementations refers to the accompanying drawings. The same reference numbers in different drawings may identify the same or similar elements.

An optical receiver may be used to receive an optical signal (e.g., an optical data signal, such as an optical communication signal) and convert the optical signal into an electrical signal that can be read by an electronic device. The optical receiver may include a monitor photodetector (e.g., a monitor photodiode) to report optical input power of the optical signal received by the optical receiver. Most of the optical input power received by the optical receiver may be used for generating one or more electrical data signals representative of information transmitted by the optical signal. Thus, a small portion of the optical input power may be tapped from the optical signal to be used by the monitor photodetector for power monitoring.

The optical receiver may include an optical receiver chip that includes an optical waveguide circuit used for obtaining one or more data signals for output to the electrical device. The power monitoring is typically performed "off-chip." In other words, the monitor photodetector is typically located external to the optical receiver chip. Therefore, the monitor photodetector is not integrated in the optical receiver chip. For example, the monitor photodetector may be included in free-space along with free-space micro-optics located off-chip from the optical receiver chip.

The free-space micro-optics typically have lower insertion loss. However, components located in free-space are vulnerable to stray light. Thus, optical power monitoring in free-space optics may have reduced accuracy due to a presence of unwanted stray light. For example, the monitor photodetector arranged in free-space may have a large aperture detector with free-space optical coupling limiting a stray light isolation to around 40 decibels (dB). However, for accurate power detection, about 50 dB may be required for low input signals.

As a result, the monitor photodetector may generate electrical signals influenced by the stray light and not solely on a portion of the optical input power of the optical signal used for power monitoring. The influence of the stray light at the monitor photodetector may cause inaccuracies (e.g., amplitude errors) in the electrical signals generated by the monitor photodetector. Therefore, the power monitoring performed by the monitor photodetector may be inaccurate and unreliable.

In addition, the free-space components generally increase system cost. Each free-space component requires individual manufacturing and assembly into the free-space. Thus, a higher quantity of free-space components, including the monitor photodetector, can increase the manufacturing cost of the optical receiver.

In some cases, the monitor photodetector may be implemented on the optical receiver chip as an in-line detector that is provided in or tapped off of a data signal waveguide of the optical receiver chip that is shared with other integrated optical components of an optical waveguide circuit. The other integrated optical components may include one or more beam splitters (e.g., polarization beam splitters), a polarization plate used for rotating a polarization of the received optical beam, and/or an optical mixer. However, including the monitor photodetector in the data signal waveguide shared with other optics can make the monitor photodetector highly temperature and wavelength (frequency) dependent, which may be difficult to calibrate accurately and/or may require temperature control. Using the monitor photodetector as an in-line detector may also be susceptible to local oscillator (LO) reflections downstream, thus degrading LO isolation of the monitor photodetector from stray light originating from an LO signal. As a result, implementing the monitor photodetector as an in-line detector on the data signal waveguide with a low split ratio may not be as temperature and wavelength stable as a free-space splitter with a free-space monitor photodetector.

Some implementations provide an optical receiver with a monolithically integrated monitor photodetector (e.g., a monitor photodiode) integrated on an integrated optical receiver chip. In other words, the monitor photodetector is integrated "on-chip" of the integrated optical receiver chip. As a result, the monitor photodetector may be isolated from unwanted stray light, thereby improving accuracy in power monitoring measurements, especially for low optical signal levels. In addition, the monitor photodetector may be integrated with a waveguide that is separate from a data signal waveguide on which other integrated optical components of the integrated optical receiver are provided. As a result, temperature and wavelength (frequency) dependencies of the monitor photodetector can be reduced.

In some implementations, the monitor photodetector may be provided with a dedicated optical port that is independent of an optical signal input port of the integrated optical receiver chip. The monitor photodetector may be integrated within a monitoring waveguide structure of the integrated optical receiver chip that receives a tapped optical signal as a low-power optical signal from a free-space optical assembly. The monitoring waveguide structure may be solely dedicated to the monitor photodetector such that the monitoring waveguide structure is separate and independent from other optical waveguides (e.g., the data signal waveguide) integrated within the integrated optical receiver chip. Thus, the monitoring waveguide structure may provide high isolation from stray light originating elsewhere within a chip package of the integrated optical receiver chip.

In some implementations, an active region (e.g., a light sensitive area or sensor area) of the monitor photodetector may be integrated at or near a chip facet of the chip package of the integrated optical receiver. The active region may be arranged to be separate and independent of the optical signal input port of the integrated coherent optical receiver. In other words, the active region may be implemented as or at the dedicated optical port of the integrated optical receiver that is independent of the optical signal input port. Thus, the monitor photodetector may be integrated in the integrated optical receiver, at the dedicated optical port, without the monitoring waveguide structure.

In addition, integrating the monitor photodetector onto the integrated optical receiver chip may enable a size (e.g., a footprint or form factor) of the optical receiver to be reduced.

FIG. 1A shows an optical receiver 100A according to one or more implementations. The optical receiver 100A includes a housing 102, an optical assembly 104 (e.g., free-space optics) arranged in free-space within the housing 102, and an integrated receiver chip 106 arranged in the housing 102 and optically coupled to the optical assembly 104. While the optical assembly 104 is arranged within the housing 102, the optical assembly 104 is arranged external (e.g., not integrated in) the integrated receiver chip.

The housing 102 includes an optical input port 108 configured to receive a receive (RX) optical signal as an optical input signal. For example, the optical input port 108 may be coupled to an optical fiber cable of a fiber optic network. The optical fiber cable may be used for transmitting the RX optical signal from a transmitter to the optical receiver 100A. In some implementations, the RX optical signal may carry one or more data signals that are converted into respective electrical signals by the optical receiver 100A.

The optical assembly 104 is configured to receive the RX optical signal from the optical input port 108 and direct one or more optical signals derived from the RX optical signal towards the integrated receiver chip 106. The optical assembly 104 may include one or more free-space optical components for directing, focusing, collimating, splitting, converting, and/or manipulating the RX optical signal. For example, the optical assembly 104 may include a beam splitter 110 configured to receive the RX optical signal and split the RX optical signal into an optical monitoring signal S1 and an optical data signal S2. The optical monitoring signal S1 may include a first portion of an optical input power of the RX optical signal, whereas the optical data signal S2 may include a second portion (e.g., a remaining portion) of the optical input power of the RX optical signal. For example, in some implementations, the first portion of the optical input power may be significantly smaller than the second portion of the optical input power.

For example, the first portion of the optical input power may be less than 10% of the optical input power, and the second portion of the optical input power may be greater than 90% of the optical input power. In some implementations, the first portion of the optical input power may be less than 5% of the optical input power, and the second portion of the optical input power may be greater than 95% of the optical input power. Accordingly, the beam splitter 110 may be configured to split the RX optical signal into the optical monitoring signal S1 and the optical data signal S2 based on a predefined power split ratio of beam splitter 110. The first portion of the optical input power may be sufficient for using the optical monitoring signal S1 for power monitoring, while the second portion of the optical input power may be sufficient for generating accurate electrical data signals, especially for applications that provide RX optical signals with low optical input power.

The optical assembly 104 may further include a reflector 112 that is configured to receive the optical data signal S2 from the beam splitter 110, and direct the optical data signal S2 towards the integrated receiver chip 106. Accordingly, the optical assembly 104 is arranged between the optical input port 108 and the integrated receiver chip 106, external to the integrated receiver chip 106.

The optical assembly 104 may include one or more lenses (not explicitly shown) used for focusing or collimating light onto one or more other free-space optical components of the optical assembly 104 (e.g., onto the beam splitter 110 or the reflector 112) and/or for focusing light onto a respective optical port of the integrated receiver chip 106.

The integrated receiver chip 106 may include a chip facet 114. The chip facet 114 may represent outer surfaces (e.g., outer lateral surfaces or sides) of the integrated receiver chip 106. The integrated receiver chip 106 may include a data port 116 arranged at the chip facet 114 of the integrated receiver chip 106 and configured to receive at least a portion of the optical data signal S2. In this example, the data port 116 receives the optical data signal S2 from the reflector 112. The integrated receiver chip 106 may also include a power monitoring port 118 arranged at the chip facet 114 and configured to receive the optical monitoring signal S1 from the beam splitter 110. The power monitoring port 118 is a dedicated monitor photodiode port used for receiving the optical monitoring signal S1 and for performing a power monitoring function of the RX optical signal.

While the integrated receiver chip 106 is shown as including only a single data port, the integrated receiver chip 106 may include two or more data ports. Additionally, in some implementations, the integrated receiver chip 106 may include a local oscillator (LO) port (not shown in FIG. 1A) used as a reference port for receiving an optical LO signal. The optical LO signal may be mixed with one or more optical data signals by an optical mixer or an optical hybrid. For example, the optical LO signal may be used as a reference signal for demodulating the one or more optical data signals. Thus, an integrated receiver chip that does not use an optical LO signal may be referred to as a direct detect receiver chip, and an integrated receiver chip that uses an optical LO signal may be referred to as a coherent receiver chip. In some implementations, the integrated receiver chip 106 may be a photonic integrated circuit. In some implementations, the integrated receiver chip 106 may be a dual polarization in-phase and quadrature (IQ) coherent receiver optical hybrid chip.

In some implementations, the integrated receiver chip 106 may include one or more grating couplers, and light may be coupled into an outer top surface or an outer bottom surface of the integrated receiver chip 106 via a respective grating coupler. For example, one or more optical ports, such as the data port 116, the power monitoring port 118, the LO port, or any other optical port described herein may be arranged at the outer top surface or the outer bottom surface of the integrated receiver chip 106. A grating coupler may be configured to redirect light that is received out-of-plane to a chip plane of the integrated receiver chip 106 to be parallel (e.g., in-plane) with the chip plane of the integrated receiver chip 106.

The integrated receiver chip 106 may include a substrate 120 in or on which one or more waveguides and integrated optical components are integrated. In some implementations, the substate 120 may be a semiconductor substrate. Additionally, one or more cladding layers may be arranged in (e.g., integrated in) and/or arranged on the substrate 120. Each waveguide may include a waveguide core arranged in the one or more cladding layers of the integrated receiver chip 106. Each waveguide core may have a refractive index that is greater than a refractive index of a material, such as cladding material, that is adjacent to the waveguide core. Thus, the one or more waveguide cores may be used to form one or more waveguides along which a respective optical signal propagates. In other words, each waveguide (e.g., each waveguide core) forms an optical path for carrying a respective optical signal through a respective portion of the integrated receiver chip 106. For example, each waveguide (e.g., each waveguide core) may be coupled to a respective optical port (e.g., the data port 116 or the power monitoring port 118) for coupling light into the waveguide.

Moreover, one or more integrated optical components may be integrated in the one or more cladding layers and coupled to a respective waveguide for receiving an optical signal therefrom. For example, integrated optical components of an optical waveguide circuit, such as splitters, variable optical attenuators, polarizers, polarization rotators, optical mixers, and 90° hybrid couplers may be integrated within the one or more cladding layers. In some implementations, doped regions may be formed (e.g., implanted) in the substrate 120 (e.g., a semiconductor substrate) to form one or more photodiodes described herein. Thus, one or more photodiodes may be integrated within the substrate 120. In some implementations, one or more photodiodes (e.g., one or more monitor photodiodes and/or one or more data diodes) may be implemented as waveguide photodiodes within the one or more cladding layers. Thus, the monitor photodiodes and/or the data photodiodes, as described herein, may be integrated photodiodes and/or may be waveguide photodiodes.

The integrated receiver chip 106 may include a first waveguide 122 coupled to the data port 116 and configured to transmit at least the portion of the optical data signal S2 from the data port 116 to an optical waveguide circuit 124 of the integrated receiver chip 106. For example, the optical waveguide circuit 124 may include a data photodiode 126 configured to convert the optical data signal S2 into an electrical data signal S3 that is representative of data transmitted in the RX optical signal that is provided to the data photodiode 126 by the optical data signal S2. The data photodiode 126 may be monolithically integrated in the integrated receiver chip 106. For example, the data photodiode 126 may be monolithically integrated in the substrate 120 or in the one or more cladding layers. The data photodiode 126 may be a high-speed photodiode capable of processing optical signals at high-data rates.

Additionally, the integrated receiver chip 106 may include a second waveguide 128 coupled to the power monitoring port 118 and configured to transmit the optical monitoring signal S1 from the power monitoring port 118 to a monitor photodiode 130 that is monolithically integrated in the integrated receiver chip 106. For example, the monitor photodiode 130 may be monolithically integrated in the substrate 120 or in the one or more cladding layers. The monitor photodiode 130 may be configured to receive the optical monitoring signal S1 and convert the optical monitoring signal S1 into an electrical monitoring signal S4 representative of an optical input power of the RX optical signal. For example, the electrical monitoring signal S4 may represent an optical power of the optical monitoring signal S1. Thus, the optical input power of the RX optical signal can be determined, for example, by a power monitoring circuit, based on the predefined power split ratio power split ratio of beam splitter 110.

The power monitoring port 118 and the second waveguide 128 are spatially separated from the data port 116 and the first waveguide 122. In other words, an optical path of the optical monitoring signal S1 is separated from an optical path of the optical data signal S2. Moreover, the second waveguide 128 is configured to isolate the monitor photodiode 130 from stray light (e.g., stray light originating inside housing 102 or on the integrated receiver chip 106). For example, the stray light may originate as light leakage from the first waveguide 122 within the integrated receiver chip 106. The second waveguide 128 may prevent at least a portion of the stray light (e.g., by reflection or scattering) from entering the second waveguide 128 and/or from being incident on the monitor photodiode 130. In other words, the second waveguide 128 may preclude stray light from entering the monitor photodiode 130. As a result, an accuracy of the electrical monitoring signal S4 in relation to the optical power of the optical monitoring signal S1 may be improved. In addition, as a result of being integrated onto the integrated receiver chip 106, the monitor photodiode 130 may be isolated from temperature variations, which may lead to the electrical monitoring signal S4 having improved accuracy in relation to the optical power of the optical monitoring signal S1. In addition, as a result of being integrated onto the integrated receiver chip 106, the optical receiver 100A includes fewer optical components in free-space (e.g., the optical assembly 104 may have fewer free-space optical components), which may result in reduced manufacturing costs due to a simplified assembly associated with fewer assembly steps.

A power monitoring circuit 132 may be provided as part of the optical receiver 100A or as a device external to the optical receiver 100A. The power monitoring circuit 132 may be configured to evaluate the electrical monitoring signal S4. For example, the power monitoring circuit 132 may be configured to determine the optical input power of the RX optical signal based on the electrical monitoring signal S4. In some implementations, the power monitoring circuit 132 may be configured to adjust a parameter of at least one component of the optical waveguide circuit 124 based on the electrical monitoring signal S4. For example, the power monitoring circuit 132 may be configured to adjust an attenuation of a variable optical attenuator of the optical waveguide circuit 124. In some implementations, the power monitoring circuit 132 may be configured to adjust a transmission power of a transmitter of the RX optical signal based on the electrical monitoring signal S4. In some implementations, the power monitoring circuit 132 may be configured to detect a fault in an optical fiber cable (e.g., a fracture or a deterioration in the optical fiber cable) coupled to the optical input port 108 based on the electrical monitoring signal S4. Accordingly, the optical receiver 100A may include an integrated signal power detector with low noise and improved optical and electrical isolation for increased accuracy at low optical signal levels.

As indicated above, FIG. 1A is provided as an example. Other examples may differ from what is described with regard to FIG. 1A. The number and arrangement of devices and components shown in FIG. 1A are provided as an example. In practice, there may be additional devices or components, fewer devices or components, different devices or components, or differently arranged devices or components than those shown in FIG. 1A.

Figure 1B:
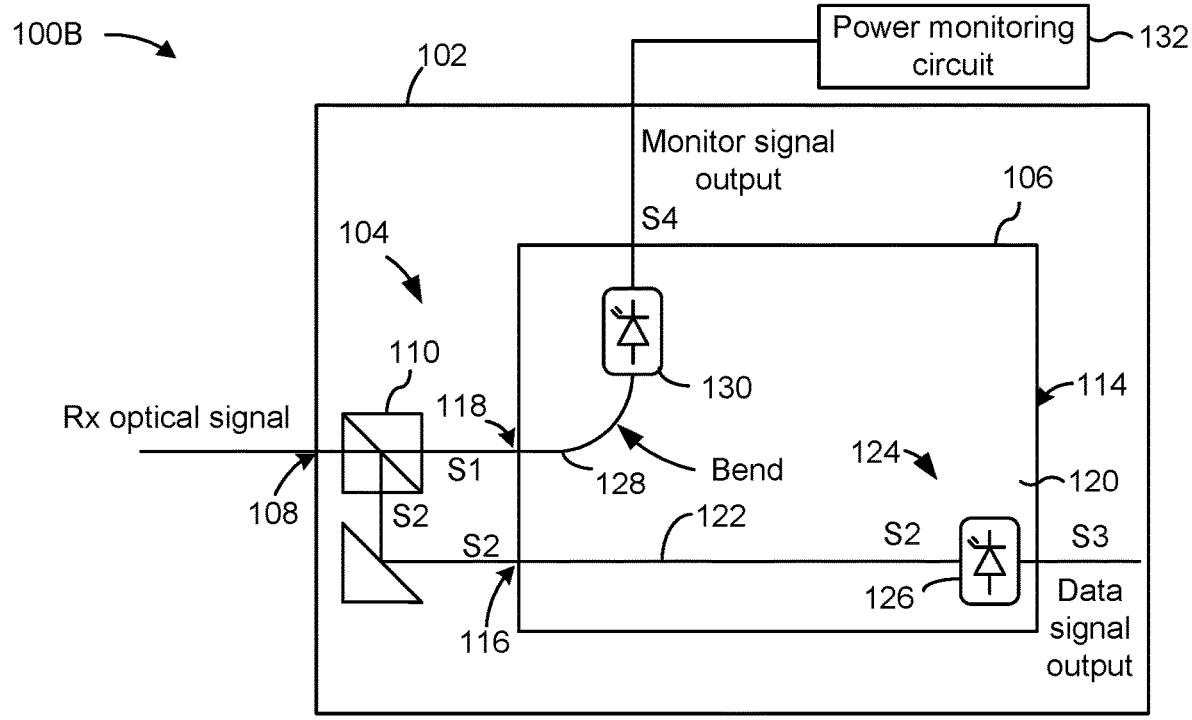
FIG. 1B shows an optical receiver according to one or more implementations.

FIG. 1B shows an optical receiver 100B according to one or more implementations. The optical receiver 100B is similar to the optical receiver 100A described in connection with FIG. 1A, except that the second waveguide 128 has a bend or curvature that turns away from the first waveguide 122 in order to further isolate the monitor photodiode 130 from stray light originating from the optical data signal S2. In contrast the second waveguide 128 shown in FIG. 1A is a straight waveguide with no bend or curvature. An angle of the bend or curvature may be configured according to a curvature function that limits an excitation of the optical monitoring signal S1 into higher order modes. In some implementations, the angle of the bend may be 90° or approximately 90°.

As indicated above, FIG. 1B is provided as an example. Other examples may differ from what is described with regard to FIG. 1B.

Figures 1C, 1D:
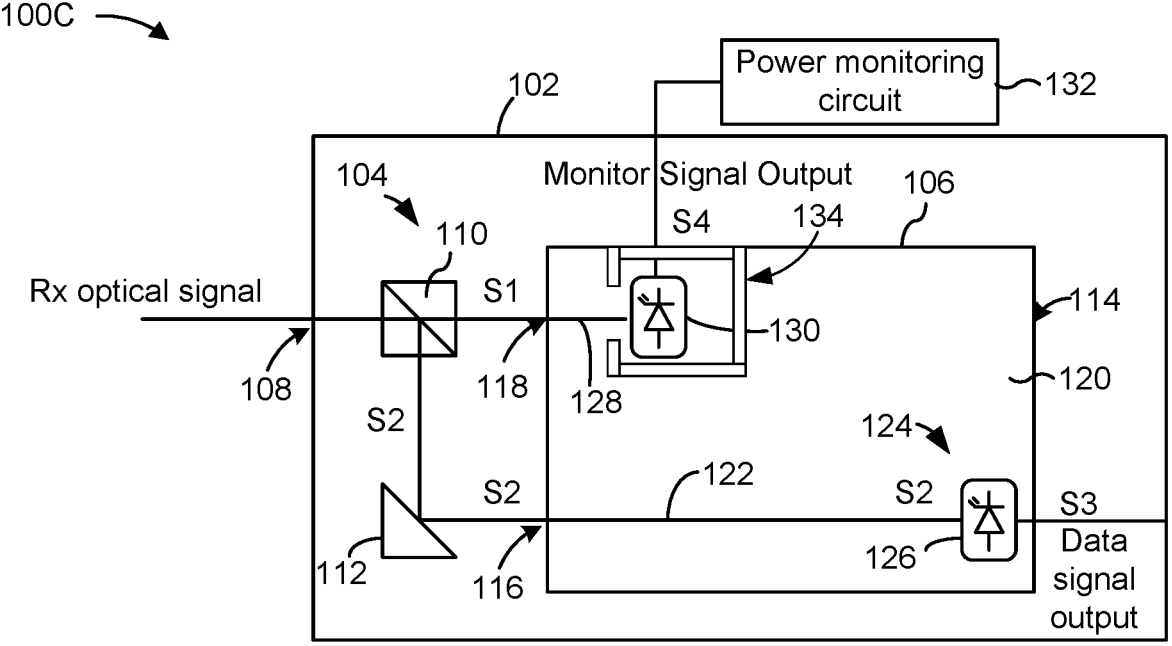
FIG. 1C shows an optical receiver according to one or more implementations.
FIG. 1D shows an optical receiver according to one or more implementations.

FIG. 1C shows an optical receiver 100C according to one or more implementations. The optical receiver 100C is similar to the optical receiver 100A described in connection with FIG. 1A, except that the integrated receiver chip 106 includes an isolation region 134 formed at least partially around the monitor photodiode 130 and configured to at least one of optically isolate or electrically isolate the monitor photodiode 130 from optical interference or electrical interference, respectively.

For example, in some implementations, the isolation region 134 includes one or more isolation trenches formed, in the substrate 120 and/or one or more cladding layers, at least partially around the monitor photodiode 130. The one or more isolation trenches may be arranged to optically isolate the monitor photodiode 130 from stray light (e.g., stray light originating from the first waveguide 122 due to light leakage). The one or more isolation trenches may deflect stray light away from the monitor photodiode 130. Thus, an accuracy of the electrical monitoring signal S4 in relation to the optical power of the optical monitoring signal S1 may be improved. In some implementations, the isolation region 134 may have a different arrangement from the arrangement shown in FIG. 1C. For example, the isolation region 134 may be arranged between the first waveguide 122 and the second waveguide 128 or another waveguide that may be integrated within the integrated receiver chip 106 (e.g., an additional data waveguide or an LO waveguide) in order to optically isolate the second waveguide 128 from the first waveguide 122 or the other waveguide.

Additionally, or alternatively, the isolation region 134 may include one or more implant regions formed, in the substrate 120, at least partially around the monitor photodiode 130. The implant region may be arranged to electrically isolate the monitor photodiode 130 from electrical interference. Thus, an accuracy of the electrical monitoring signal S4 in relation to the optical power of the optical monitoring signal S1 may be improved.

As indicated above, FIG. 1C is provided as an example. Other examples may differ from what is described with regard to FIG. 1C. For example, the optical receiver 100C may incorporate features described in connection with FIG. 1B, such as a curved waveguide.

FIG. 1D shows an optical receiver 100D according to one or more implementations. The optical receiver 100D includes features that are similar to the optical receiver 100A described in connection with FIG. 1A. In addition, the housing 102 may include an LO input port 136 configured to receive an optical LO signal as a reference signal. Additionally, the integrated receiver chip 106 may include an LO port 138 (e.g., a reference port), configured to receive the optical LO signal from the LO input port 136, and a third waveguide 140 coupled to the LO port 138 and configured to transmit the LO signal from the LO port 138 to the optical waveguide circuit 124 of the integrated receiver chip 106. The LO port 138 may be coupled to an optical fiber cable that carries the LO signal. The optical waveguide circuit 124 may include an optical mixer circuit 142 that is configured to mix the optical data signal S2 with the optical LO signal to generate a plurality of optical data signals. In some implementations, the optical LO signal and the optical RX signal will have the same polarization. In some implementations, the optical mixer circuit 142 may include a single optical mixer (e.g., a 90° hybrid) configured to mix the optical data signal S2 with the optical LO signal to generate a plurality of optical data signals. For example, the plurality of optical data signals may have a phase constellation (e.g., four quadrature states associated with the LO signal, including in-phase (I) and quadrature (Q) phase components). The optical waveguide circuit 124 may further include a plurality of data photodiodes 126-1, 126-2, 126-3, and 126-4 that respectively receive one of the plurality of optical data signals from the optical mixer circuit 142, and convert the plurality of optical data signals into electrical data signals S3 that are provided to the data signal output of the integrated receiver chip 106.

The second waveguide 128 may be configured to optically isolate the monitor photodiode 130 from stray light within the integrated receiver chip 106, which may originate from the first waveguide 122, the third waveguide 140, and/or the optical waveguide circuit 124 due to, for example, light leakage.

As indicated above, FIG. 1D is provided as an example. Other examples may differ from what is described with regard to FIG. 1D. For example, the optical receiver 100D may incorporate features described in connection with FIGS. 1B and/or 1C, such as a curved waveguide and or an isolation region.

Figure 2:
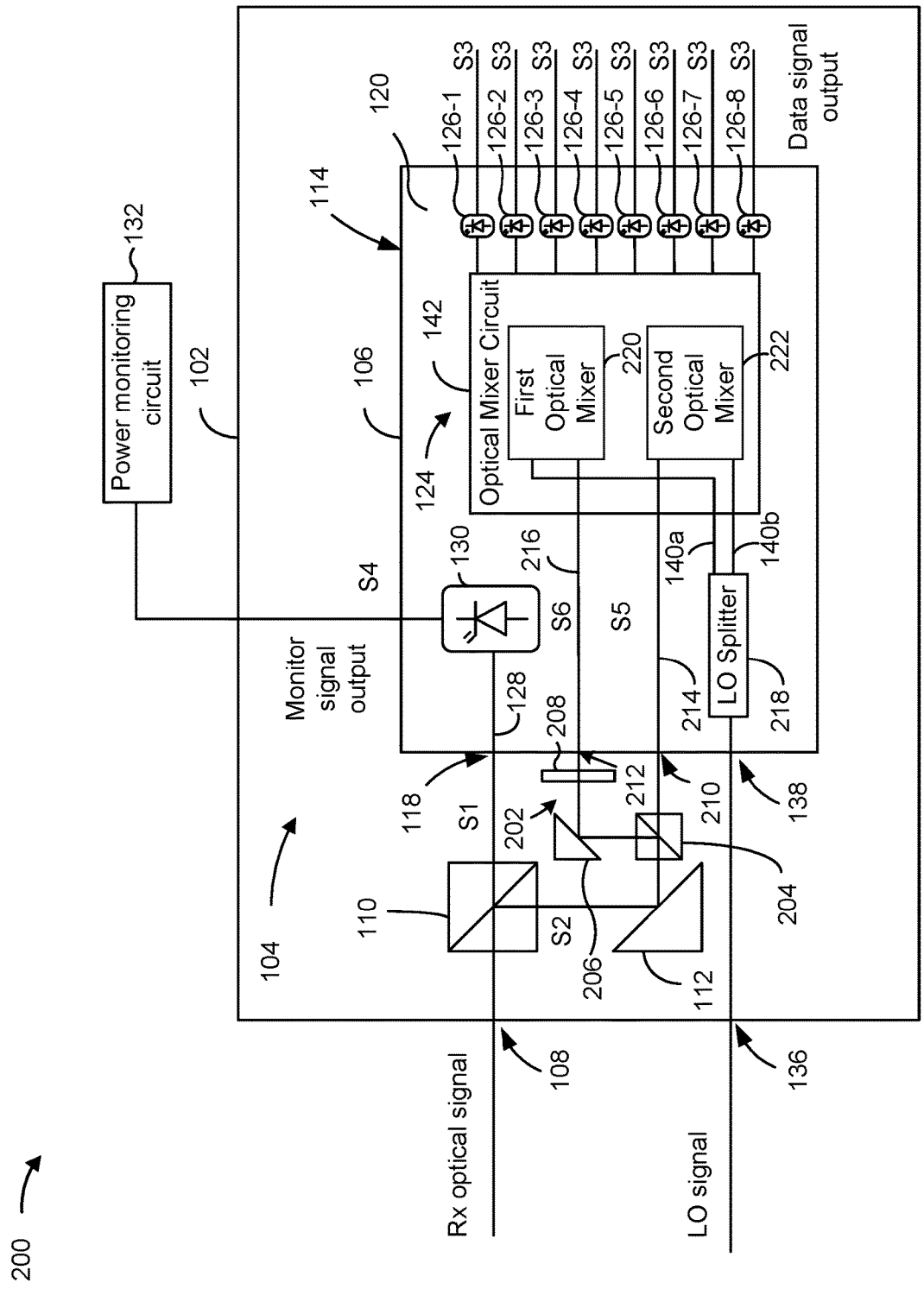
FIG. 2 shows an optical receiver according to one or more implementations.

FIG. 2 shows an optical receiver 200 according to one or more implementations. The optical receiver 200 includes features that are similar to the to the optical receiver 100D described in connection with FIG. 1D. The optical receiver 200 includes a housing 102, an optical assembly 104 arranged in free-space within the housing 102, and an integrated receiver chip 106 arranged in the housing 102 and optically coupled to the optical assembly 104. The RX optical signal may be a combination of two data signals (e.g., two optical signals) that can be separated or parsed out from each other by the optical assembly 104. For example, the optical assembly 104 may further include a polarization beam splitter assembly 202 configured to receive the optical data signal S2 from the reflector 112 and split the optical data signal S2 into a first polarized optical data signal S5 and a second polarized optical data signal S6. The first polarized optical data signal S5 may have a first polarization (e.g., an x-polarization) and may correspond to a first optical data signal provided by the RX optical signal. The second polarized optical data signal S6 may have a second polarization (e.g., a y-polarization) that is orthogonal to the first polarization and may correspond to a second optical data signal provided by the RX optical signal.

In some implementations, the polarization beam splitter assembly 202 may include a polarization beam splitter 204, a reflector 206, and a polarization rotator 208 (e.g., a waveplate). The polarization beam splitter 204 may be arranged to receive the optical data signal S2 from the reflector 112 and split the optical data signal S2 into two optical signals, with one optical signal of the two optical signals being the first polarized optical data signal S5. The other optical signal of the two optical signals is transmitted towards the reflector 206 and ultimately to the polarization rotator 208, which rotates the other optical signal 90° in order to generate the second polarized optical data signal S6.

Thus, the polarization beam splitter 204 may be a polarization beam splitter that may provide a portion of the RX optical signal as x-polarized light (e.g., light with a first linear polarization) and directs the x-polarized light to the integrated receiver chip 106. In addition, the polarization beam splitter 204 provides a second portion of the RX signal as y-polarized light and directs this second portion to the polarization rotator 208. The polarization rotator 208 may rotate this second portion of the RX optical signal (e.g., the y-polarized portion) to generate a second x-polarized portion S6. Thus, the optical assembly 104 may be configured to generate two x-polarized optical data signals S5 and S6 from the RX optical signal.

The integrated receiver chip 106 may include a first data port 210 for receiving the first polarized optical data signal S5 and a second data port 212 for receiving the second polarized optical data signal S6.

The integrated receiver chip 106 may include a waveguide 214 coupled to the first data port 210 and configured to receive the first polarized optical data signal S5 from the first data port 210. The waveguide 214 may be configured to transmit the first polarized optical data signal S5 from the first data port 210 to the optical mixer circuit 142 of the optical waveguide circuit 124. The integrated receiver chip 106 may include a waveguide 216 coupled to the second data port 212 and configured to receive the second polarized optical data signal S6 from the second data port 212. The waveguide 216 may be configured to transmit the second polarized optical data signal S6 from the second data port 212 to the optical mixer circuit 142 of the optical waveguide circuit 124.

The integrated receiver chip 106 may include an LO splitter 218 integrated in the one of more cladding layers of the integrated receiver chip 106. The LO splitter 218 may be coupled to the LO port 138 for receiving the LO signal. The LO splitter 218 may split the LO signal into two LO portions (e.g., two equal or substantially equal portions) and output the two LO portions to waveguides 140a and 140b, respectively. For example, a first portion of the LO signal may be transmitted along the waveguide 140a and a second portion of the LO signal may be transmitted along the waveguide 140b. The optical mixer circuit 142 may receive the two LO portions from the LO splitter 218 via the waveguides 140a and 140b.

The optical mixer circuit 142 may be configured to receive the first polarized optical data signal S5, the second polarized optical data signal S6, and the two portions of the optical LO signal. The optical mixer circuit 142 may include two optical mixers (e.g., two 90° hybrids), including a first optical mixer 220 and a second optical mixer 222. In some implementations described herein, such as the optical receiver 100D shown in FIG. 1D, the optical mixer circuit 142 may include a single optical mixer (e.g., only one 90° hybrid).

The first optical mixer 220 may be configured to receive the second polarized optical data signal S6 and the first portion of the optical LO signal, and mix the second polarized optical data signal S6 and the first portion of the optical LO signal to generate a first plurality of optical data signals. The second optical mixer 222 may be configured to receive the first polarized optical data signal S5 and the second portion of the optical LO signal, and mix the first polarized optical data signal S5 and the second portion of the optical LO signal to generate a second plurality of optical data signals.

For example, the second optical mixer 222 may mix the first polarized optical data signal S5 with the second portion of the optical LO signal to demodulate the first polarized optical data signal S5. The second optical mixer 222 may generate the second plurality of optical data signals from the mixing of the first polarized optical data signal S5 with the second portion of the optical LO signal.

Similarly, the first optical mixer 220 may mix the second polarized optical data signal S6 with the first portion of the optical LO signal to demodulate the second polarized optical data signal S6. The first optical mixer 220 may generate the first plurality of optical data signals from the mixing of the second polarized optical data signal S6 with the first portion of the optical LO signal.

The optical waveguide circuit 124 may further include the plurality of data photodiodes 126-1, 126-2, 126-3, 126-4, 126-5, 126-6, 126-7, and 126-8 that respectively receive one of the plurality of optical data signals from the optical mixer circuit 142, and convert the plurality of optical data signals into electrical data signals S3 that are provided to the data signal output of the integrated receiver chip 106. For example, the data photodiodes 126-1, 126-2, 126-3, and 126-4 may be optically coupled to the first optical mixer 220 for receiving and converting the first plurality of optical data signals, respectively, and the data photodiodes 126-5, 126-6, 126-7, and 126-8 may be optically coupled to the second optical mixer 222 for receiving and converting the second plurality of optical data signals, respectively.

The waveguide 128 may be configured to optically isolate the monitor photodiode 130 from stray light within the integrated receiver chip 106, which may originate from the waveguide 214, the waveguide 216, the waveguide 140, and/or the optical waveguide circuit 124 due to, for example, light leakage.

In some implementations, the optical assembly 104 may include additional free-space optical components configured to split the first polarized optical data signal S5 into two optical signals, including a first portion used for power monitoring and a second portion used for data processing. The additional free-space optical components may be arranged, for example, between the polarization rotator 208 and the integrated receiver chip 106. Thus, the integrated receiver chip 106 may include an optical port for receiving the first portion of the first polarized optical data signal S5 and another optical port for receiving the second portion of the first polarized optical data signal S5. Additionally, the integrated receiver chip 106 may include a monitor photodiode integrated receiver chip 106 for receiving the first portion of the first polarized optical data signal S5 and converting the first portion of the first polarized optical data signal S5 into an electrical signal representative of an optical power of the first polarized optical data signal S5. The first portion of the first polarized optical data signal S5 may be provided to the monitor photodiode by a dedicated waveguide that is separate from all other waveguides. Thus, the first portion of the first polarized optical data signal S5 may be monitored by a dedicated monitor photodiode. The second portion of the first polarized optical data signal S5 may be provided to the optical waveguide circuit 124 by another dedicated waveguide, similar to the waveguide 216.

In some implementations, the optical assembly 104 may include additional free-space optical components configured to split the second polarized optical data signal S6 into two optical signals, including a first portion used for power monitoring and a second portion used for data processing. The additional free-space optical components may be arranged, for example, between the polarization beam splitter 204 and the integrated receiver chip 106. Thus, the integrated receiver chip 106 may include an optical port for receiving the first portion of the second polarized optical data signal S6 and another optical port for receiving the second portion of the second polarized optical data signal S6. Additionally, the integrated receiver chip 106 may include a monitor photodiode integrated in the integrated receiver chip 106 for receiving the first portion of the second polarized optical data signal S6 and converting the first portion of the second polarized optical data signal S6 into an electrical signal representative of an optical power of the second polarized optical data signal S6. The first portion of the second polarized optical data signal S6 may be provided to the monitor photodiode by a dedicated waveguide that is separate from all other waveguides. Thus, the first portion of the second polarized optical data signal S6 may be monitored by a dedicated monitor photodiode. The second portion of the second polarized optical data signal S6 may be provided to the optical waveguide circuit 124 by another dedicated waveguide, similar to the waveguide 214.

As indicated above, FIG. 2 is provided as an example. Other examples may differ from what is described with regard to FIG. 2. For example, the optical receiver 100D may incorporate features described in connection with FIGS. 1B and/or 1C, such as a curved waveguide and or an isolation region.

Figure 3:
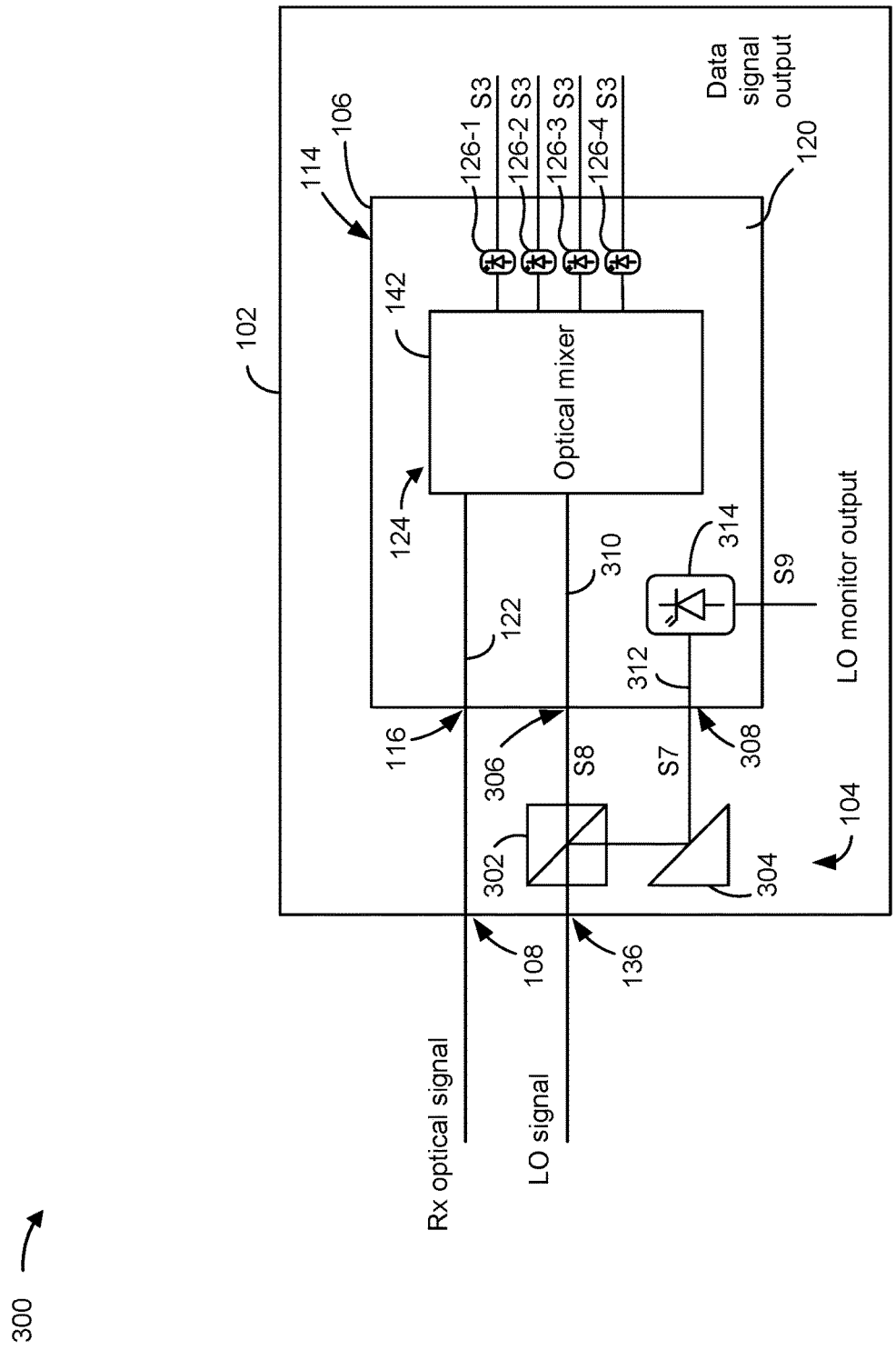
FIG. 3 shows an optical receiver according to one or more implementations.

FIG. 3 shows an optical receiver 300 according to one or more implementations. The optical receiver 300 includes a housing 102, an optical assembly 104 arranged in free-space within the housing 102, and an integrated receiver chip 106 arranged in the housing 102 and optically coupled to the optical assembly 104.

The housing 102 includes the optical input port 108 to receive the RX optical signal and the LO input port 136 for receiving the optical LO signal. The RX optical signal is provided to the data port 116 of the integrated receiver chip 106, where the RX optical signal is coupled into waveguide 122. In some implementations, the optical LO signal and the optical RX signal will have the same polarization. For simplicity, only one single polarization RX optical signal is shown. A dual polarization signal, as described in connection with FIG. 2, could also be provided. The waveguide 122 may be configured to provide the RX optical signal to the optical waveguide circuit 124. For example, the waveguide 122 may be configured to provide the RX optical signal to the optical mixer circuit 142.

The optical assembly 104 is configured to receive the LO signal from the LO input port 136 and direct one or more optical signals derived from the LO signal towards the integrated receiver chip 106. The optical assembly 104 may include one or more free-space optical components for directing, focusing, collimating, splitting, converting, and/or manipulating the LO signal. For example, the optical assembly 104 may include a beam splitter 302 configured to receive the LO signal and split the LO signal into an LO monitoring signal S7 and a reference signal S8. The LO monitoring signal S7 may include a first portion of an optical input power of the LO signal, whereas the reference signal S8 may include a second portion (e.g., a remaining portion) of the optical input power of the LO signal. For example, in some implementations, the first portion of the optical input power of the LO signal may be significantly smaller than the second portion of the optical input power of the LO signal.

For example, the first portion of the optical input power may be less than 10% of the optical input power, and the second portion of the optical input power may be greater than 90% of the optical input power. In some implementations, the first portion of the optical input power may be less than 5% of the optical input power, and the second portion of the optical input power may be greater than 95% of the optical input power. Accordingly, the beam splitter 302 may be configured to split the LO signal into the LO monitoring signal S7 and the reference signal S8 based on a predefined power split ratio of beam splitter 302. The first portion of the optical input power may be sufficient for using the LO monitoring signal S7 for power monitoring, while the second portion of the optical input power may be sufficient for demodulating the RX optical signal in order to generate accurate electrical data signals, especially for applications that provide LO signals with low optical input power.

The optical assembly 104 may further include a reflector 304 that is configured to receive the LO monitoring signal S7 from the beam splitter 302, and direct the LO monitoring signal S7 towards the integrated receiver chip 106. Accordingly, the optical assembly 104 is arranged between the LO input port 136 and the integrated receiver chip 106, external to the integrated receiver chip 106.

The optical assembly 104 may include one or more lenses (not explicitly shown) used for focusing or collimating light onto one or more other free-space optical components of the optical assembly 104 (e.g., onto the beam splitter 302 or the reflector 304) and/or for focusing light onto a respective optical port of the integrated receiver chip 106.

The integrated receiver chip 106 may include the chip facet 114. The integrated receiver chip 106 may include a data port 116 arranged at the chip facet 114 and configured to receive the RX optical signal. The integrated receiver chip 106 may also include a reference port 306 and a power monitoring port 308 arranged at the chip facet 114. The reference port 306 may be configured to receive the reference signal S8, and the power monitoring port 308 may be configured to receive the LO monitoring signal S7 from the optical assembly 104. The power monitoring port 308 is a dedicated monitor photodiode port used for receiving the LO monitoring signal S7 and for performing a power monitoring function of the LO signal.

The integrated receiver chip 106 may include a waveguide 310 formed in or on the substrate 120 and coupled to the reference port 306. The waveguide 310 may be configured to transmit the reference signal S8 from the reference port 306 to the optical waveguide circuit 124 (e.g., to the optical mixer circuit 142). Additionally, the integrated receiver chip 106 may include a waveguide 312 formed in or on the substrate 120 and coupled to the power monitoring port 308. The waveguide 312 may be configured to transmit the LO monitoring signal S7 from the power monitoring port 308 to a monitor photodiode 314 that is monolithically integrated in the integrated receiver chip 106. The monitor photodiode 314 may be configured to receive the LO monitoring signal S7 and convert the LO monitoring signal S7 into an electrical monitoring signal S9 representative of an optical input power of the LO signal received at the LO input port 136. For example, the electrical monitoring signal S9 may represent an optical power of the LO monitoring signal S7. Thus, the optical input power of the LO signal can be determined, for example, by a power monitoring circuit, based on the predefined power split ratio power split ratio of beam splitter 302.

The optical input power of the LO signal can be used to adjust a parameter of at least one component of the optical waveguide circuit 124. For example, a power monitoring circuit (e.g., power monitoring circuit 132) may be configured to adjust an attenuation of a variable optical attenuator of the optical waveguide circuit 124 based on the electrical monitoring signal S9. In some implementations, the power monitoring circuit may be configured to adjust a transmission power of a transmitter of the LO signal based on the electrical monitoring signal S9. In some implementations, the power monitoring circuit may be configured to detect a fault in an optical fiber cable (e.g., a fracture or a deterioration in the optical fiber cable) coupled to the LO input port 136 based on the electrical monitoring signal S9.

The optical mixer circuit 142 may be configured to mix the RX optical signal and the reference signal S8 in order to demodulate the RX optical signal. For example, the optical mixer circuit 142 may generate two optical data signals based on mixing the RX optical signal and the reference signal S8. One of the two optical data signals may be an in-phase (I) component of the RX optical signal and the other one of the two optical data signals may be a quadrature (Q) phase component of the RX optical signal. Thus, phases of the two optical data signals may be shifted 90° relative to each other. The optical waveguide circuit 124 may further include a plurality of data photodiodes 126-1, 126-2, 126-3, and 126-4 that respectively receive one of the plurality of optical data signals from the optical mixer circuit 142, and convert the plurality of optical data signals into electrical data signals S3 that are provided to the data signal output of the integrated receiver chip 106. The electrical data signals S3 may be representative of data transmitted in the RX optical signal. The data photodiodes 126-1, 126-2, 126-3, and 126-4 may be monolithically integrated in the integrated receiver chip 106. The data photodiodes 126-1, 126-2, 126-3, and 126-4 may be high-speed photodiodes capable of processing optical signals at high-data rates.

The data port 116, the reference port 306, and the power monitoring port 308 are spatially separated from each other. In other words, the optical paths of the RX optical signal, the LO monitoring signal S7, and the reference signal S8 are separated from each other. Moreover, the waveguide 312 is configured to isolate the monitor photodiode 314 from stray light within the chip package 114 (e.g., stray light from the RX optical signal and/or the reference signal S8). For example, the stray light may originate as light leakage from the waveguide 122 and/or the waveguide 310 within the chip package 114. The waveguide 312 may prevent at least a portion of the stray light (e.g., by reflection) from entering the waveguide 312 and/or from being incident on the monitor photodiode 314. In other words, the waveguide 312 may deflect stray light away from the monitor photodiode 314. As a result, an accuracy of the electrical monitoring signal S9 in relation to the optical power of the LO monitoring signal S7 may be improved.

In addition, as a result of being integrated onto the integrated receiver chip 106, the monitor photodiode 314 may be isolated from temperature variations, which may lead to the electrical monitoring signal S9 having improved accuracy in relation to the optical power of the LO monitoring signal S7. In addition, as a result of being integrated onto the integrated receiver chip 106, the optical receiver 300 includes fewer free-space optical components in free-space (e.g., the optical assembly 104 may have fewer free-space optical components), which may result in reduced manufacturing costs due to a simplified assembly associated with fewer assembly steps.

In some implementations, an isolation region may be formed around the monitor photodiode 314, as similarly described in connection with FIG. 1C. In some implementations, the waveguide 312 may have a bend or curvature that turns away from the waveguide 122 and/or waveguide 310 to isolate the monitor photodiode 314 from stray light originating from the waveguide 122 and/or waveguide 310.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. For example, the power monitoring of the RX optical signal, as described in connection with FIGS. 1A-1D and 2 may be included in the optical receiver 300, such that both the power monitoring of the RX optical signal via the monitoring photodiode 130 and the power monitoring of the LO signal via the monitor photodiode 314 are integrated on the integrated receiver chip 106.

Figure 4:
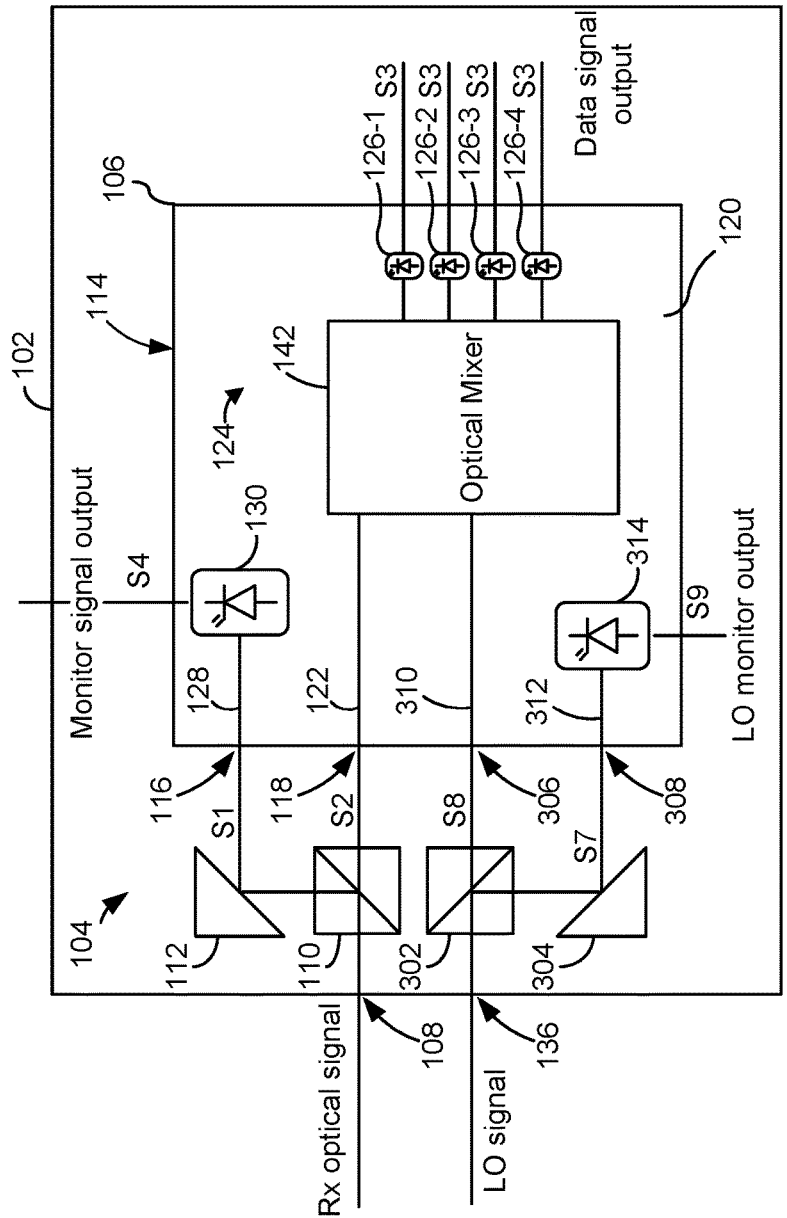
FIG. 4 shows an optical receiver according to one or more implementations.

FIG. 4 shows an optical receiver 400 according to one or more implementations. The optical receiver 400 includes a power monitoring configuration for monitoring the RX optical signal via the optical assembly 104 and the monitoring photodiode 130, as similarly described in connection with FIG. 1D, and a power monitoring configuration for monitoring the LO signal via the optical assembly 104 and the monitor photodiode 314, as similarly described in connection with FIG. 3. In some implementations, the optical LO signal and the optical RX signal will have the same polarization. For simplicity, only one single polarization RX optical signal is shown. A dual polarization signal, as described in connection with FIG. 2, could also be provided. Thus, both the monitoring photodiode 130 and the monitor photodiode 314 are monolithically integrated on the integrated receiver chip 106. Moreover, the waveguide 122 may be configured to optically isolate the monitor photodiode 130 from stray light originating within the chip package 114. Similarly, the waveguide 312 may be configured to optically isolate the monitor photodiode 314 from stray light originating within the chip package 114.

As indicated above, FIG. 4 is provided as an example. Other examples may differ from what is described with regard to FIG. 4.

Figure 5:
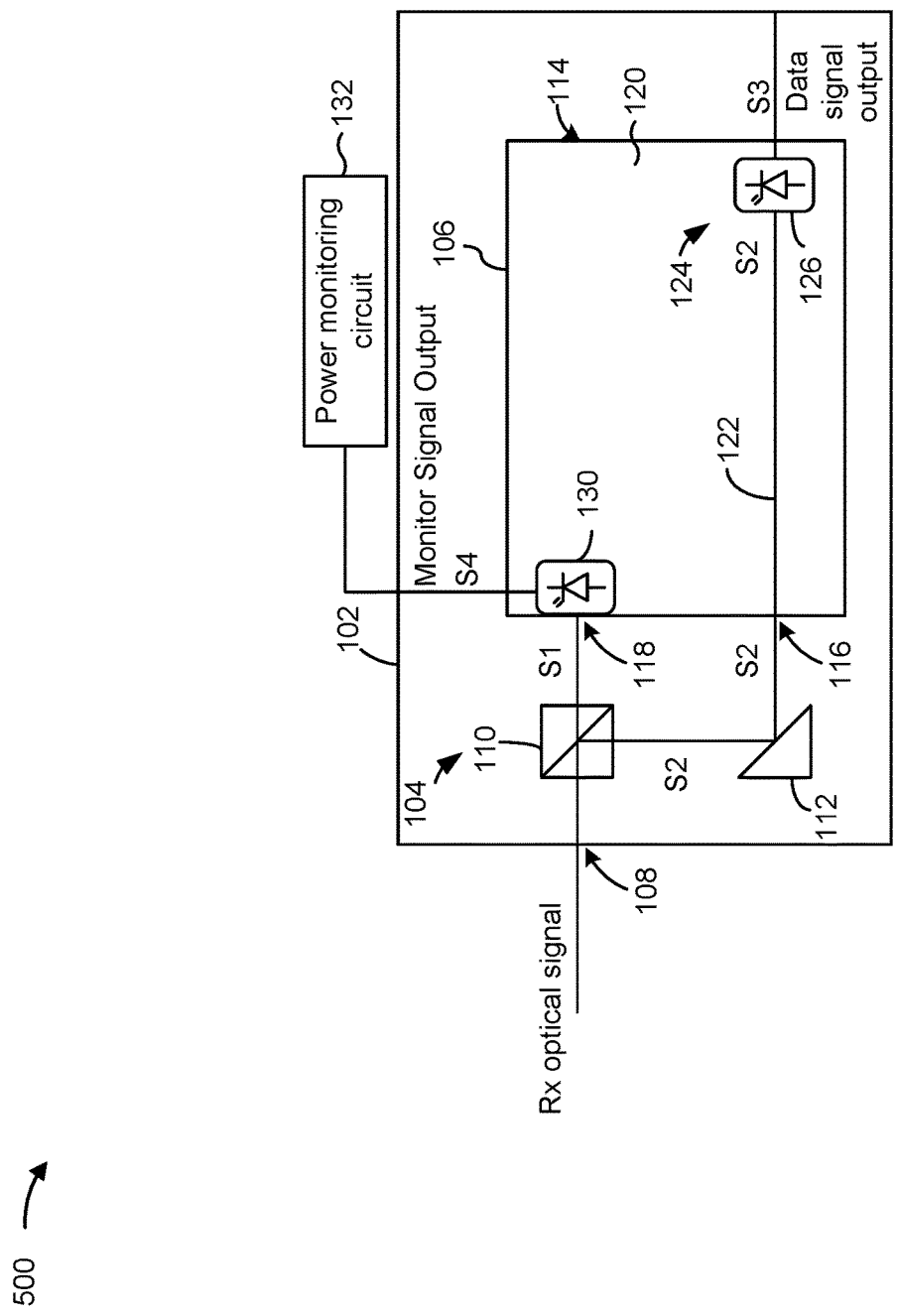
FIG. 5 shows an optical receiver according to one or more implementations.

FIG. 5 shows an optical receiver 500 according to one or more implementations. The optical receiver 500 is similar to the optical receiver 100A described in connection with FIG. 1A, except that the monitor photodiode 130 is monolithically integrated at the power monitoring port 118 of the integrated receiver chip 106. Thus, an additional waveguide (e.g., waveguide 128) is not used for transmitting the optical monitoring signal S1 to the monitor photodiode 130. As a result, the monitor photodiode 130 receives the optical monitoring signal S1 at the chip facet or other outer surface of the integrated receiver chip 106. The monitor photodiode 314 described above in connection with FIGS. 3 and 4 for monitoring the LO signal could be similarly monolithically integrated at the power monitoring port 308 of the integrated receiver chip 106.

As indicated above, FIG. 5 is provided as an example. Other examples may differ from what is described with regard to FIG. 5.

Accordingly, by integrating a monitor photodetector in the integrated receiver chip 106 with a dedicated monitor photodiode port (e.g., a dedicated power monitoring port), the optical power monitoring is performed on-chip while still utilizing the benefits of the free-space optical assembly 104. As a result, an optical receiver may require fewer components and fewer assembly steps, and may result in lower manufacturing costs. Additionally, or alternatively, integrating the monitor photodetector in the integrated receiver chip 106 may allow further miniaturization of the optical receiver. Additionally, or alternatively, integrating the monitor photodetector in the integrated receiver chip 106 may provide improved stray light isolation for the optical power monitoring, which may in turn improve monitoring accuracy, especially at low input power. Thus, the monitor photodetector may be provided as an integrated signal power detector with low noise and improved optical and electrical isolation for increased accuracy at low optical signal levels.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical receiver, comprising:
    a housing comprising an optical port configured to receive a receive (RX) optical signal;
    an optical assembly arranged in the housing, wherein the optical assembly comprises a beam splitter configured to receive the RX optical signal and split the RX optical signal into an optical monitoring signal and an optical data signal; and
    an integrated receiver chip arranged in the housing,
        wherein the optical assembly is arranged between the optical port and the integrated receiver chip, external to the integrated receiver chip;
        wherein the integrated receiver chip includes, within the integrated receiver chip:
            a data port arranged at a chip facet of the integrated receiver chip and configured to receive at least a portion of the optical data signal,
            a first waveguide coupled to the data port and configured to transmit at least the portion of the optical data signal from the data port to an optical waveguide circuit of the integrated receiver chip,
            a power monitoring port arranged at the chip facet of the integrated receiver chip and configured to receive the optical monitoring signal, and
            a second waveguide coupled to the power monitoring port and configured to transmit the optical monitoring signal to a monitor photodiode that is monolithically integrated in the integrated receiver chip; and
        wherein the monitor photodiode is configured to receive the optical monitoring signal and convert the optical monitoring signal into an electrical signal representative of an optical input power of the RX optical signal.

2. The optical receiver of claim 1, wherein the second waveguide is configured to isolate the monitor photodiode from stray light.

3. The optical receiver of claim 1, further comprising:
    a power monitoring circuit configured to evaluate the electrical signal,
        wherein the power monitoring circuit is configured to adjust a parameter of at least one component of the optical waveguide circuit based on the electrical signal, adjust a transmission power of a transmitter of the RX optical signal based on the electrical signal, or detect a fault in an optical cable coupled to the optical port based on the electrical signal.

4. The optical receiver of claim 1, wherein the data port is a first data port,
    wherein the optical assembly further comprises a polarization beam splitter assembly configured to receive the optical data signal and split the optical data signal into a first polarized optical data signal and a second polarized optical data signal,
    wherein the first data port is configured to receive the first polarized optical data signal, and
    wherein the integrated receiver chip includes a second data port configured to receive the second polarized optical data signal and a third waveguide coupled to the second data port and configured to transmit the second polarized optical data signal from the second data port to the optical waveguide circuit of the integrated receiver chip.

5. The optical receiver of claim 4, wherein the integrated receiver chip includes a reference port configured to receive a reference signal and a fourth waveguide coupled to the reference port and configured to transmit the reference signal from the reference port to the optical waveguide circuit of the integrated receiver chip.

6. The optical receiver of claim 4, wherein the integrated receiver chip is an integrated coherent receiver chip.

7. The optical receiver of claim 1, wherein the integrated receiver chip includes a local oscillator port configured to receive a local oscillator signal and a third waveguide coupled to the local oscillator port and configured to transmit the local oscillator signal from the local oscillator port to the optical waveguide circuit of the integrated receiver chip.

8. The optical receiver of claim 1, wherein the optical waveguide circuit includes a data photodiode configured to receive the optical data signal and convert the optical data signal into an electrical data signal representative of data provided by the optical data signal.

9. The optical receiver of claim 1, wherein the power monitoring port is a first power monitoring port, the monitor photodiode is a first monitor photodiode, and the electrical signal is a first electrical signal,
    wherein the optical assembly further comprises a local oscillator beam splitter configured to receive a local oscillator signal and split the local oscillator signal into a reference signal and a local oscillator monitoring signal,
    wherein the integrated receiver chip includes a reference port configured to receive the reference signal, a third waveguide coupled to the reference port and configured to transmit the reference signal from the reference port to the optical waveguide circuit of the integrated receiver chip, a second power monitoring port configured to receive the local oscillator monitoring signal, a fourth waveguide coupled to the second power monitoring port and configured to transmit the local oscillator monitoring signal to a second monitor photodiode that is monolithically integrated in the integrated receiver chip, and wherein the second monitor photodiode is configured to receive the local oscillator monitoring signal and convert the local oscillator monitoring signal into a second electrical signal representative of an optical input power of the local oscillator signal.

10. The optical receiver of claim 9, wherein the fourth waveguide is configured to isolate the second monitor photodiode from stray light.

11. The optical receiver of claim 1, wherein the second waveguide has a curvature that turns away from the first waveguide to isolate the monitor photodiode from stray light originating from the optical data signal.

12. The optical receiver of claim 1, wherein the integrated receiver chip includes an isolation region formed at least partially around the monitor photodiode and configured to at least one of optically isolate or electrically isolate the monitor photodiode from optical interference or electrical interference, respectively.

13. The optical receiver of claim 12, wherein the isolation region includes an isolation trench formed at least partially around the monitor photodiode, and wherein the isolation trench is configured to optically isolate the monitor photodiode from stray light.

14. The optical receiver of claim 13, wherein the stray light originates from the first waveguide.

15. The optical receiver of claim 12, wherein the isolation region includes an implant region formed at least partially around the monitor photodiode, and wherein the implant region is configured to electrically isolate the monitor photodiode from electrical interference.

16. The optical receiver of claim 1, wherein the integrated receiver chip includes an isolation region formed between the monitor photodiode and the first waveguide, and wherein the isolation region is configured to optically isolate the monitor photodiode from optical interference originating from the first waveguide.

17. The optical receiver of claim 1, wherein the integrated receiver chip includes an isolation region formed between the first waveguide and the second waveguide and configured to optically isolate the second waveguide from optical interference originating from the first waveguide.

18. The optical receiver of claim 17, wherein the isolation region includes an isolation trench formed, in the integrated receiver chip, between the first waveguide and the second waveguide, and wherein the isolation trench is configured to optically isolate the monitor photodiode from stray light.

19. An optical receiver, comprising:

a housing comprising an optical port configured to receive a receive (RX) optical signal;

an optical assembly arranged in the housing, wherein the optical assembly comprises a beam splitter configured to receive the RX optical signal and split the RX optical signal into an optical monitoring signal and an optical data signal; and an integrated receiver chip arranged in the housing, wherein the optical assembly is arranged between the optical port and the integrated receiver chip, external to the integrated receiver chip;

wherein the integrated receiver chip includes, within the integrated receiver chip:

a data port arranged at an outer surface of the integrated receiver chip and configured to receive at least a portion of the optical data signal, a waveguide coupled to the data port and configured to transmit at least the portion of the optical data signal from the data port to an optical waveguide circuit of the integrated receiver chip, a power monitoring port arranged at the outer surface of the integrated receiver chip, and a monitor photodiode that is monolithically integrated at the power monitoring port; and wherein the monitor photodiode is configured to receive the optical monitoring signal and convert the optical monitoring signal into an electrical signal representative of an optical input power of the RX optical signal.

20. An optical receiver, comprising:

a housing comprising an optical port configured to receive a receive (RX) optical signal;

an optical assembly arranged in the housing, wherein the optical assembly comprises a beam splitter configured to receive a local oscillator signal and split the local oscillator signal into a reference signal and a local oscillator monitoring signal; and an integrated receiver chip arranged in the housing, wherein the integrated receiver chip includes:

a data port configured to receive at least a portion of the RX optical signal, a reference port configured to receive the reference signal, a power monitoring port configured to receive the local oscillator monitoring signal, a first waveguide coupled to the data port and configured to transmit at least the portion of the RX optical signal from the data port to an optical waveguide circuit of the integrated receiver chip, a second waveguide coupled to the reference port and configured to transmit the reference signal from the reference port to the optical waveguide circuit of the integrated receiver chip, and a third waveguide coupled to the power monitoring port and configured to transmit the local oscillator monitoring signal to a monitor photodiode that is monolithically integrated in the integrated receiver chip;

wherein the monitor photodiode is configured to receive the local oscillator monitoring signal and convert the local oscillator monitoring signal into an electrical signal representative of an optical input power of the local oscillator signal; and wherein the optical assembly is arranged between the optical port and the integrated receiver chip, external to the integrated receiver chip.

* * * * *